Dec. 16, 1958 C. Z. LE MAY 2,864,139

METHOD AND APPARATUS FOR PRODUCING INTERMEDIATE SEMI-CONDUCTOR PRODUCT

Filed May 19, 1953

INVENTOR

Charlotte Z. LeMay

BY Stevens, Davis, Miller & Mosher

ATTORNEYS

United States Patent Office
2,864,139
Patented Dec. 16, 1958

2,864,139

METHOD AND APPARATUS FOR PRODUCING INTERMEDIATE SEMI-CONDUCTOR PRODUCT

Charlotte Z. Le May, Dallas, Tex., assignor to Texas Instruments Incorporated, Dallas, Tex., a corporation of Delaware Application May 19, 1953, Serial No. 356,055
9 Claims. (Cl. 22—67)

This invention relates to an intermediate product to be used in producing a known concentration of impurity in transistors and semi-conductors, to a method for making said intermediate product, and to apparatus for making said intermediate product.

The electrical properties of materials, such as germanium, used as semi-conductors and transistors are greatly affected by the amount and type of trace impurities present. The term impurity used in this art refers to the intentional addition of some material other than the one constituting the semi-conductor or transistor. The presence of a trace impurity in the semi-conductor material results in its exhibiting either P type or N type conductivity.

To produce P type conductivity in a semi-conductor, traces of elements from the third group of the periodic table such as boron, aluminum, gallium and indium are added to the semi-conductor material. As the elements from the third group have a valence of three as compared with a valence of four for germanium, as the semi-conductor material, the substitution of atoms of the element from the third group into the germanium crystal lattice results in an unsatisfied valence bond. This condition is produced as each atom of the element of the third group can satisfy only three of the four electron bonds required by each germanium atom in the crystal lattice. Thus one electron bond of the germanium atom remains unsatisfied. This unsatisfied bond is referred to in the art as a "hole." The application of an electric field across a piece of germanium including traces of an element from the third group of the periodic table causes an electron from a nearby satisfied bond to be carried to the unsatisfied bond thus leaving a "hole" to be filled in turn by another electron from an adjacent valence bond. The apparent effect produced by these electron "jumps" is that of a migrating positive charge in a direction opposite to that of the electron movement.

To produce "N type" conductivity traces of an element of the fifth group of the periodic table, such as arsenic, phosphorus, antimony and nitrogen, are added to the semi-conductor material. Elements from this group have a valence of five and when added to germanium, which is characterized by a valence of four, only four electron bonds can be shared by two atoms of the two different elements, and thereby one valence bond of the atom of the element from the fifth group is left unshared. Stated in another way, there is one excess electron which is loosely bound to the impurity atom. This excess electron can be readily raised to the conduction band by the application of a fraction of an electron volt. When a potential is applied to a piece of germanium containing an element from the fifth group, these excess electrons contribute to conduction by carrying a negative charge from one area of the germanium to another. The magnitude of conductivity or its reciprocal resistivity is a function of the number of excess electrons available for conduction.

Materials which will produce N-type conductivity are commonly called donor impurities because they give up electrons. Conversely, material which will produce P-type conductivity are generally referred to as acceptor impurities as they take up electrons. The utility of forming transistor or semi-conductor materials characterized by either N-type conductivity or P-type conductivity is well recognized in this art.

The production of semi-conductor crystals with a definite P or N-type conductivity is difficult to achieve in practice. The ratio by weight of semi-conductor material to impurity material in the completed semi-conductor crystal is in the order of a million or more to one. In relation to the size of semi-conductor crystals which can be produced, the impurity materials are present in such minute amounts that it is not feasible to weigh them directly analytically. The weight of impurity per gram of semi-conductor material to produce a desired concentration in the completed semi-conductor crystal varies from $10^{-6}$ grams to about $10^{-8}$ grams. The minuteness of the amount of impurity materials present will be further appreciated when it is considered that weights less than $10^{-5}$ grams cannot be accurately weighed on an analytical balance.

In the past, one of the main disadvantages to producing semi-conductor crystals with a specific concentration of an impurity material has been the uncertainty of obtaining an homogeneous crystal with a known concentration of impurity uniformly distributed throughout the crystal.

It is, accordingly, an object of the present invention to provide an intermediate product to be used in producing a known concentration of impurity in semi-conductor crystals, a method for making such an intermediate product and apparatus for making such an intermediate product.

It is another object of the present invention to provide an intermediate product which can be added to a semi-conductor material for the purpose of forming either P-type or N-type conductivity.

It is a still further object of the present invention to provide an intermediate product and a method for making the intermediate product with a known concentration of impurity uniformly distributed throughout the intermediate product.

It is still a further object of the present invention to provide an intermediate product and method for making same with a known and uniformly distributed concentration of impurity for the introduction into a semi-conductor material. Sufficient quantities of the impurity are present in the intermediate product so that the impurity materials can be accurately weighed.

Other and further objects of the present invention will become apparent from a detailed consideration of the following description when taken in conjunction with the drawings in which.

Figure 3:
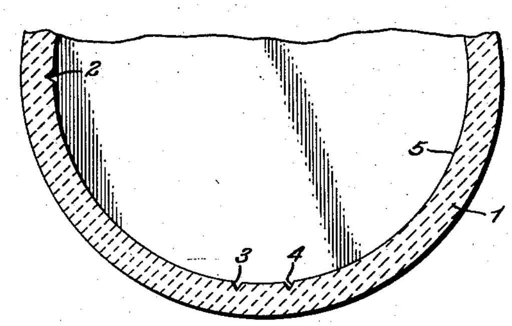
Figure 3 is a view in horizontal section of Figure 2 taken along line 3—3.

Referring to the drawing, the apparatus used in the present invention is shown in the several figures. The apparatus is wholly shown in Figure 1 in extended form and consists of the following elements. A crucible 1 characterized by a thick bottom is further characterized by V-shaped guide slots 2, 3 and 4 cut into its inside wall 5. The guide slots 3 and 4 are located any number of degrees less than 180° around the circumference of the crucible 1 from the guide slot 2. It is preferred that the guide slots 3 and 4 be located about 90° from the guide slot 2. In this respect kindly note Figure 3. The crucible 1 is arranged in conjunction with a weight 6 to be received within the crucible 1. Weight 6 is characterized by sufficient mass to create a pressure on any members or materials located in the crucible 1. A circular disc 7 is arranged to fit within the crucible 1 and forms with the crucible 1 a comparatively close fit. The tolerance of the diameter of the disc 7 is about 4 thousandths of an inch to about five thousandths of an inch. A perforated disc 8 is provided which is about .050 inch in thickness and is drilled with a large number of equally spaced restricted openings or holes 9 each having a diameter of about .050 inch. A second circular disc 10 approximately equal in thickness to the circular disc 7 is also provided. The circular disc 10 is arranged with a raised rim 11 around its circumference. This raised rim 11 is about .020 inch in height.

To produce the intermediate product of the present invention the following procedure is recommended. Initially, a desired quantity of pure semi-conductor material, such as germanium metal, is placed in the bottom of crucible 1 and, thereafter, covered by the circular disc 7 and weight 6. The crucible is then placed in a furnace and heated in an inert atmosphere such as nitrogen to avoid any contamination of the material. As the germanium metal melts, the pressure of weight 6 forces the germanium into the form of a wafer spread over the bottom of the crucible 1. As the germanium metal melts it flows into the guide slots 2, 3 and 4. After the germanium metal has melted completely, the crucible is allowed to remain in the furnace until it has cooled slowly to below 500° C. After cooling, the germanium wafer, which has solidified during the cooling operation, is removed from the crucible and the surface of the wafer is ground using standard techniques. The specific resistance of the wafer is checked across both top and bottom faces at various points. The guide slots 2, 3 and 4 are of importance in connection with the resistance measurements. During the melting of the germanium metal, a portion of the metal flows into the guide slots 2, 3 and 4. The solidified wafer, therefore, is characterized by pips corresponding in position on the wafer to the guide slots 2, 3 and 4 of the crucible 1. Hence, the specific resistance measurements of the wafer can be directly correlated to the wafer position in the crucible 1. Further, guide slots 2, 3 and 4, which produce the pips on the germanium wafer, make it impossible to reverse the crystal faces of the wafer or replace the wafer in the crucible 1 in any position other than the position in which it was formed.

In place of using three guide slots as above described, it is possible to use only two guide slots which are located at any angle less than 180 degrees apart. Using two slots, however, necessitates that the shape of the two slots be different. The two slots can be of any shape such as V-shaped, semi-circular, or square. An example of the use of two guide slots would be one of the slots being V-shaped and the other being semi-circular. It is understood, however, that any combination of two different shapes can be used for the slots.

After the pure germanium wafer has been formed and specific resistance measurements made, a desired weight of an impurity material such as arsenic or gallium is weighed with extreme accuracy. This impurity is then placed in the bottom of the crucible 1 and the germanium wafer is replaced in the crucible 1 on top of the impurity. The circular disc 7 and weight 6 are placed on top of the germanium wafer and the crucible is returned to the furnace to be heated in the inert atmosphere of nitrogen until the impurity has fused completely with the germanium wafer. Subsequent to fusion of the two ingredients, the crucible is allowed to cool slowly to below 500° C. and is then removed from the furnace and the fused product is allowed to cool further. After cooling, the new wafer is removed from the crucible 1 and lapped. The specific resistance is then checked on both sides of the wafer as before. By comparing the specific resistance measurements of the original pure germanium wafer and the new germanium wafer fused with the impurity, the uniformity of impurity dispersion and the degree of impurity concentration in the germanium can be determined.

Figure 1:
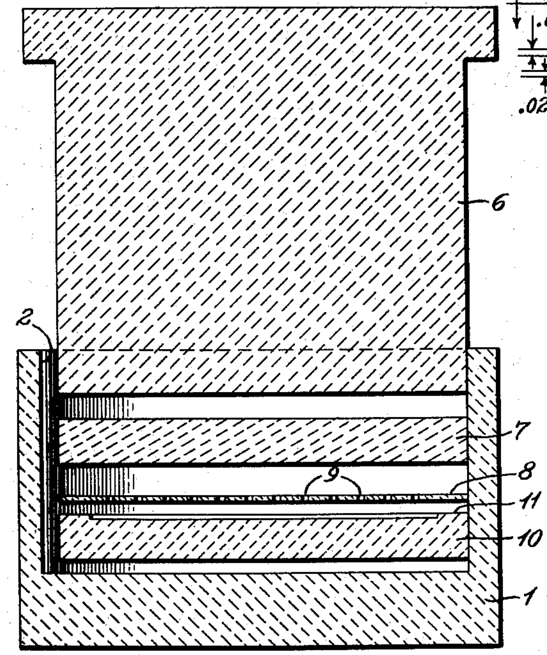
Figure 1 is a view in vertical section of the apparatus used in the present invention.
Figure 4:
Figure 4 is a view in vertical section of the disc and perforated plate used in the present invention.
Figure 5:
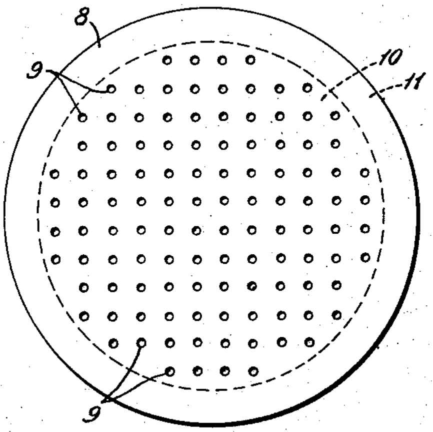
Figure 5 is a view in plan of the perforated plate.
Figure 2:
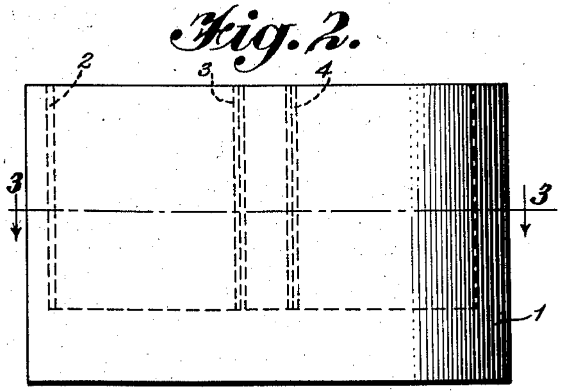
Figure 2 is a view in side elevation of the crucible used in the present invention.
Figure 6:
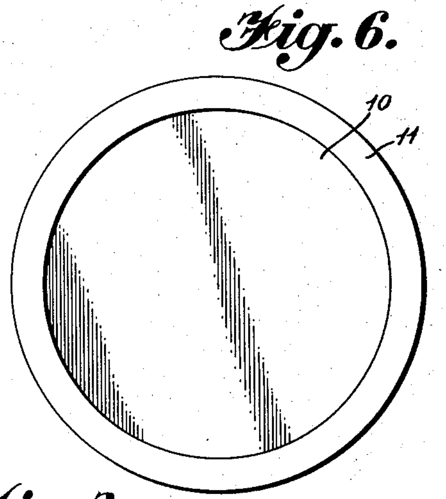
Figure 6 is a view in plan of the disc.

The final step of the process for producing the intermediate product of the present invention involves the use of all parts of the apparatus as shown in Figure 1. The circular disc 10 with the raised rim 11 is placed in the bottom of the crucible 1 with the raised rim 11 facing upwardly as shown. The thin perforated disc 8 is placed on the circular disc 10 on the raised rim 11. The germanium wafer containing the impurity is placed on the perforated disc 8. Finally, the circular disc 7 and weight 6 are placed on top of the germanium wafer containing the impurity. The assembly is then placed in the furnace and the wafer melted.

As the wafer melts, the weight 6 forces the molten metal into and through the apertures 9 in the perforated plate 8 and into the space below the perforated plate 8 formed by the raised rim 11 of the circular disc 10. As an excess of metal is present, a quantity of the molten metal will remain on top of the perforated disc 8. Thereafter, the assembly is removed from the furnace and the metal is allowed to cool and solidify. During the solidification of the metal, the germanium and impurity mixture will solidify on both sides of the perforated disc 8 as well as in each of the apertures 9 in the disc 8. The solid metal wafer with disc 8 in situ is removed from the crucible 1 and the excess metal on each side of the perforated plate 8 is ground away.

By referring to the specific resistance measurements made before and after the fusion of the impurity material with the germanium, the perforated disc 8 with the metal in the perforations can be further ground to the thickness that will produce the correct concentration for any desired application. The small cylinders of metal are then removed from the perforations 8 and they constitute the intermediate product of the present invention. Each of the cylinders of metal will have a diameter of .050 inch and a length of .050 inch or less depending upon the amount of metal that has been ground away. As stated above, the amount that has been ground away is determined by a comparison of the specific resistance before and after the addition of the impurity. The intermediate product produced by this invention can thereafter be introduced into a crystal puller to produce completed semi-conductor crystals. The operation of the crystal puller is well known in this field.

While the present invention has been shown and described in a single embodiment, nevertheless various changes and modifications obvious to one skilled in the art are within the spirit, scope and contemplation of the present invention.

What is claimed is:

1. A method of making an intermediate product to be used for producing a known concentration of impurity in a semiconductor crystal drawn from a melt that comprises producing a body of substantially pure semiconductor material, making specific resistance determinations on said body, melting said body and incorporating therewith a predetermined weighable amount of impurity, resolidifying to reform said body of semiconductor material with said impurity material dispersed therethrough, remelting said body to cause the material thereof to flow into a restricted opening, solidifying the material in said restricted opening, and determining the concentration of impurity in said solidified material on the basis of said specific resistance determinations.

2. A method as defined in claim 1 wherein said solidified material in said restricted opening is reduced in volume according to specific resistance determinations.

3. A method as defined in claim 1 wherein the material of said second body flows into and solidifies in a plurality of restricted openings.

4. A method as defined in claim 1 wherein said semiconductor material is germanium.

5. Apparatus for making an intermediate product to be used for producing a known concentration of impurity in a semiconductor crystal that comprises a crucible closed at one end, a perforated plate positioned in said crucible, support means to hold said plate in said crucible with a space defined therebetween, and plunger means to force a liquefied mixture of semiconductor material and impurity material to flow into said perforated plate, and into said space and to solidify in said perforated plate and said space.

6. Apparatus as defined in claim 5 wherein said crucible is characterized on its inside surface by at least three guide slots extending axially of said crucible with two of said guide slots located less than 180 degrees around the circumference of said crucible from said third guide slot.

7. Apparatus as defined in claim 5 wherein said support means includes a disc having a raised rim with said plate being supported in said crucible on said raised rim.

8. Apparatus as defined in claim 5 wherein said plate is characterized by a plurality of restricted openings.

9. Apparatus as defined in claim 5 wherein said crucible is characterized on its inside surface by two guide slots extending axially of said crystal with said guide slots being located less than 180 degrees apart around the circumference of said crucible, said guide slots each being of a different shape.

References Cited in the file of this patent

UNITED STATES PATENTS

| | | |
|---|---|---|
| 1,157,794 | Miller | Oct. 26, 1915 |
| 1,698,441 | Kolb | Jan. 8, 1929 |
| 1,793,672 | Bridgman | Feb. 24, 1931 |
| 2,011,772 | Mulhern | Aug. 20, 1935 |
| 2,181,157 | Smith | Nov. 28, 1939 |
| 2,394,727 | Taylor | Feb. 12, 1946 |
| 2,595,780 | Dunlap, Jr. | May 6, 1952 |
| 2,667,722 | Jenkins | Feb. 2, 1954 |
| 2,763,480 | Keller et al. | Sept. 18, 1956 |

FOREIGN PATENTS

| | | |
|---|---|---|
| 138,947 | Germany | Feb. 21, 1903 |
| 635,385 | Great Britain | Apr. 5, 1950 |

OTHER REFERENCES

Fundamentals of Physical Metallurgy by Hultgren. Published 1952, by Prentice Hall, Inc., N. Y., pages 15 and 278.